United States Patent [19]

Meyerhofer

[11] Patent Number: 5,788,257
[45] Date of Patent: Aug. 4, 1998

[54] FIFTH WHEEL TRAILER HITCH APPARATUS

[76] Inventor: Leonard Meyerhofer, P.O. Box 6005, Sugarloaf, Calif. 92386-6005

[21] Appl. No.: 633,927

[22] Filed: Apr. 17, 1996

[51] Int. Cl.[6] ........................................ B60F 3/10
[52] U.S. Cl. ............................ 280/416.1; 280/433
[58] Field of Search ........................ 280/416.1, 416.2, 280/416.3, 419, 433, 434, 441, 442, 453

[56] References Cited

U.S. PATENT DOCUMENTS

| | | |
|---|---|---|
| 3,941,407 | 3/1976 | Breford . |
| 4,183,548 | 1/1980 | Schneckloth .................. 280/433 |
| 4,199,167 | 4/1980 | Points ........................ 280/416.2 |
| 4,620,736 | 11/1986 | Shanks ....................... 280/416.1 |
| 5,120,080 | 6/1992 | Ritter . |
| 5,232,238 | 8/1993 | Ducote . |
| 5,310,204 | 5/1994 | Bagley, Jr. . |
| 5,560,630 | 10/1996 | Phares et al. ................ 280/416.1 |

OTHER PUBLICATIONS

Reese Corp. Parts List on 350 Weight Distributing Hitch and Information regarding Reese Weight Distributing Hitches.
Catalog sheet showing various Reese hitches.
Catalog sheet regarding 35510-35600-35752 Universal Pick-Up Receivers.

*Primary Examiner*—Stephen Avila
*Attorney, Agent, or Firm*—Fulwider Patton Lee & Utecht LLP

[57] ABSTRACT

A fifth wheel trailer hitch adaptor apparatus including a fifth wheel device including a housing having a stem projecting therefrom for telescopical receipt in a rearwardly opening square tube of a towing vehicle and having a fifth wheel yoke plate formed with a rearwardly extending, open ended, laterally outwardly diverging passage. An adaptor plate is provided and includes on its top side an upstanding hitch ball for receipt in the ball socket of a trailer and has a king pin on the bottom side thereof for sliding receipt into the passage for hitching to such fifth wheel device.

5 Claims, 4 Drawing Sheets

FIFTH WHEEL TRAILER HITCH APPARATUS

BACKGROUND OF THE INVENTION

1. Field of the Invention

The fifth wheel adaptor apparatus of the present invention relates to devices for hitching and unhitching a trailer from a fifth wheel mounted to a frame mounted hitch disposed under the bumper of a towing vehicle.

2. Description of the Prior Art

Current social and economics conditions dictate the availability of recreational time. Recreational activity is often associated with surroundings different from every day life. An economical and practical approach for enjoying recreational activity includes the use of recreational vehicles. A popular combination is a towing vehicle and recreational trailer. A particularly popular combination is a pickup or truck having a fifth wheel mounted in the bed thereof for coupling of a king pin carried on the underside of an overhang at the front of a trailer. Fifth wheel devices of this type are popular because of the maneuverability of the combination and the convenience with which such trailer can be coupled or uncoupled from the truck. However, the draw backs include the fact that the fifth wheel apparatus typically occupies the entire bed of the truck and leaves little space available for storage of other paraphernalia, such as sleeping bags, fishing equipment, off road motorcycles or wet bikes.

Other popular combinations include an RV trailer having a low tongue with a ball socket mounted thereon for convenient hitching to a hitch ball carried from the tow bar of the towing truck. These arrangements, while having the advantage of leaving the bed of the towing truck free of fifth wheel hitches, suffer the shortcoming that hitching of the truck to the trailer presents a substantial challenge, particularly for some of the relatively unskilled weekend travelers and particularly for relatively inexperienced individuals endeavoring to make the hitching connections by themselves. Typically, a driver backing up a truck with the hitch ball mounted beneath the bumper is required to maneuver the truck with great precision in order to exactly line the ball up under the ball socket on the trailer tongue. This procedure can involve an immense amount of maneuvering forward and rearwardly of the truck in order to make this alignment, oftentimes accompanied by instructions from a companion observing the procedure and involved in endeavoring to communicate meaningful signals in effort to direct the maneuver believed necessary to achieve the alignment. In the event of an individual driver without a companion, each time the truck is backed into an approximate position locating the hitch ball somewhat proximate the tongue, the driver must exit the truck and observe the relative relationship between the hitch ball and tongue and then re-enter the driver's seat and endeavor to recall the relative relationship between the hitch elements and further to maneuver the truck about in effort to bring the ball into precise location beneath the ball socket. This procedure can be time consuming and stressful, oftentimes detracting from the overall enjoyment of leisure time and possibly straining the relationship between the driver and companion.

Recognition of the shortcomings in the art has led to the proposal of various mechanisms for mounting a fifth wheel from a towing vehicle. One such device proposes mounting a fifth wheel apparatus on top of the truck bumper for engagement with a king pin carried from the tongue of a trailer. A device of this type is shown in U.S. Pat. No. 5,120,080 to Ritter. It has also been proposed to provide a fifth wheel mounting device which can be mounted either in the bed of a towing truck or on a sturdy bumper thereof. A device of this type is shown in U.S. Pat. No. 3,941,407 to Breford. Such devices, while satisfactory for their intended purpose, suffer the shortcoming that many original equipment vans and trucks do not incorporate sufficiently sturdy bumpers to withstand the load applied and the space above the bumper is required for access to tailgates, rear entry doors and windows and the like.

Other efforts have led to the proposal of a framework to be mounted underneath the frame of the vehicle for mounting a fifth wheel to receive a king pin of an elongated adaptor frame which then mounts a hitch ball disposed rearwardly thereof. A device of this type is shown in U.S. Pat. No. 5,310,204 to Bagley. Such devices, while providing for a form of fifth wheel attachments, suffer the shortcoming that they are rather relatively cumbersome and impractical for the unsophisticated and non-mechanically inclined tourist interested in weekend recreational vehicle outings.

Thus, there exists a need for a practical and inexpensive adaptor which can readily adapt a towing vehicle hitch disposed beneath the vehicle bumper for coupling to a trailer to provide the advantages of fifth wheel hitching.

SUMMARY OF THE INVENTION

The adaptor apparatus of the present invention is characterized by an adaptor configured for releasably coupling to a tow bar of a conventional towing vehicle and mounting either a fifth wheel or king pin for, as the case may be, coupling to a trailer via an adaptor mounting a king pin or via a fifth wheel itself. One embodiment of the adaptor is a plate having mounted on the top side thereof a hitch ball for receipt in the hitch socket of a conventional trailer and on the bottom side thereof a king pin for releasable locking into a fifth wheel carried from the tow bar.

Other objects and features of the invention will become apparent from consideration of the following description taken in conjunction with the accompanying drawing.

DESCRIPTION OF THE PREFERRED EMBODIMENTS

Figure 1:
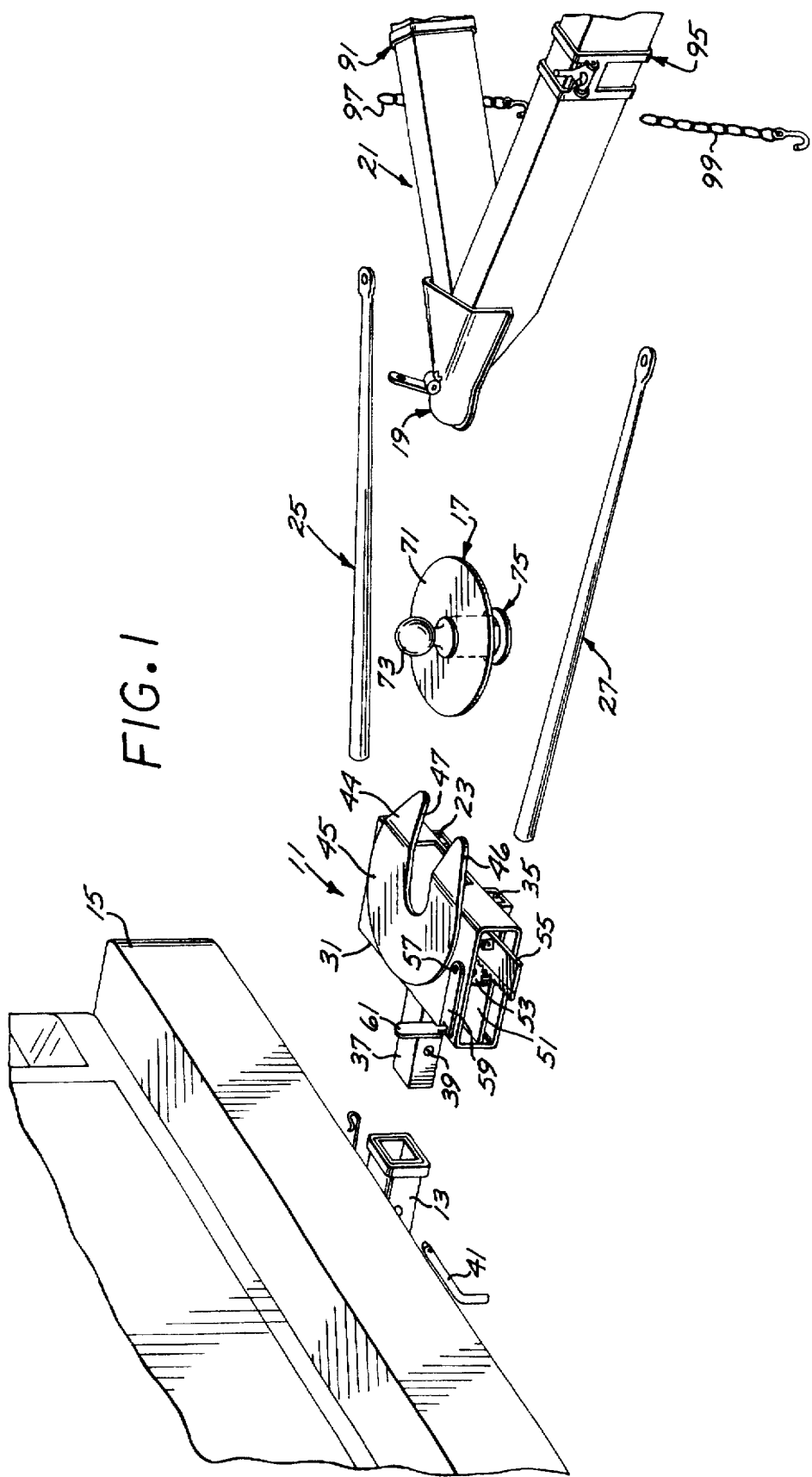
FIG. 1 is a perspective view of a fifth wheel trailer hitch adaptor apparatus embodying the present invention.
Figure 2:
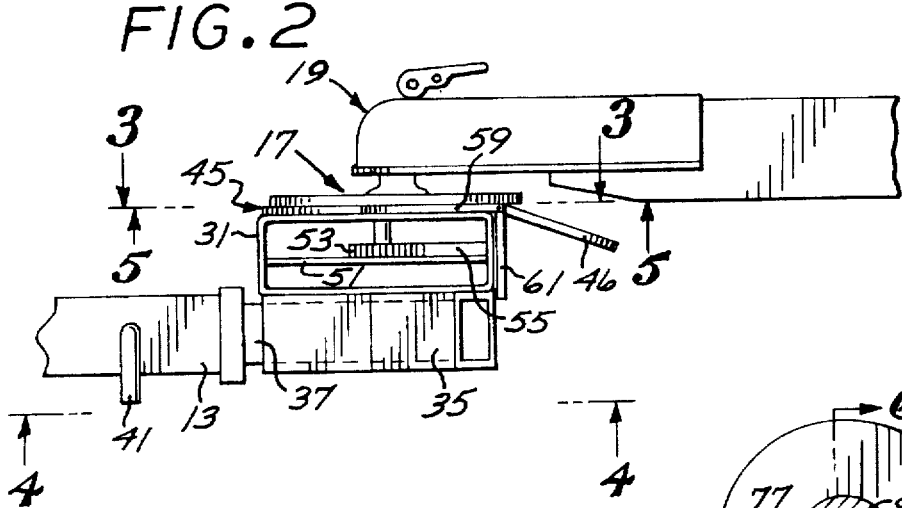
FIG. 2 is a left side view of the fifth wheel trailer hitch adaptor shown in FIG. 1 but with the trailer hitched to the tow vehicle.
Figure 3:
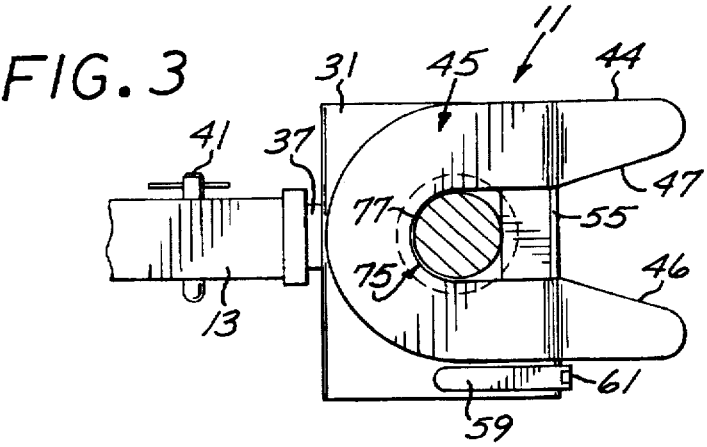
FIG. 3 is a horizontal sectional view, taken along the line 3—3 in FIG. 2 and looking down on the fifth wheel.
Figure 5:
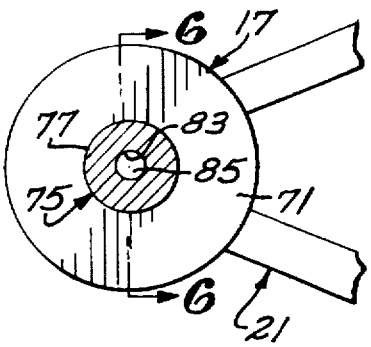
FIG. 5 is a horizontal sectional view, taken along the line 5—5 in FIG. 2.
Figure 4:
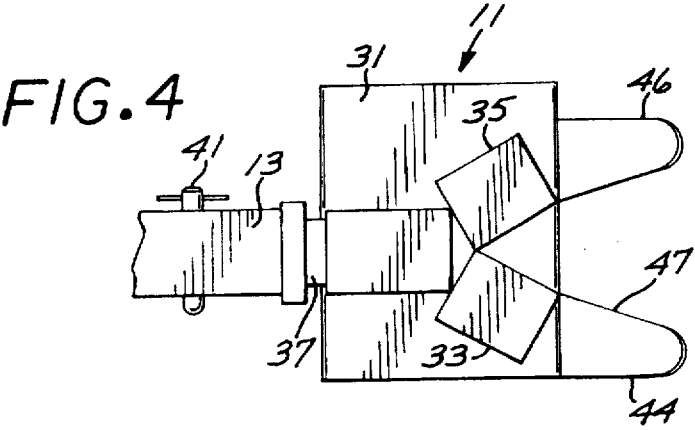
FIG. 4 is a bottom plan view of the fifth wheel trailer hitch apparatus shown in FIG. 2.

Referring to FIG. 1, the fifth wheel hitch adaptor apparatus of the present invention includes, generally, a fifth wheel device 11 (FIG. 1) engageable with a rearwardly opening tube 13 of a frame mounted hitch projecting under a rear bumper 15. An adaptor, generally designated 17, may be provided for coupling with the ball hitch, generally designated 19, of a trailer, generally designated 21. A pair of weight distributing spring bars, generally designated 25 and 27, may be removably coupled between the fifth wheel hitch 11 and trailer 21 for favorable weight distribution. Thus, the hitching function may be achieved by mounting one portion of the fifth wheel coupling mechanism to the receiver 13 of the frame mounted hitch and the opposite portion thereof coupled with the tongue of the trailer 21 for convenient hitching of the trailer to the towing vehicle.

The shortcoming of ball and socket trailer hitches which require precise alignment during the coupling together of the hitching components has long been known. Numerous different devices have been proposed to facilitate the coupling together of such hitches. Proposals to mount a fifth wheel hitching device to the bumper of a vehicle have been generously unsatisfactory since many recreational vehicles, small trucks and automobiles do not incorporate factory bumpers having a sufficiently sturdy design to support the weight and withstand the stress applied thereto by a trailer being hitched thereto. This shortcoming has presented extreme challenges in the commercial trailer rental industry where customers desire to hitch a rental trailer to the back bumper of an automobile. Many trailer rental agencies will merely refuse to rent a trailer to be hitched to an automotive bumper out of concern for the proposition that the rental agency may incur liability for damage done to the bumper during hauling and maneuvering of the trailer. Consequently, there exists a need for a practical fifth wheel trailer hitch apparatus which can be conveniently, removably mounted to a frame mounted hitch of a towing vehicle and which can be coupled to a trailer with weight distributing spring bars to enhance favorable distribution of the trailer load.

Referring to FIGS. 1–6, an exemplary embodiment of the hitch apparatus of the present invention incorporates a fifth wheel hitch device 11 in the form of a transversely projecting rectangular tube defining an open ended housing 31 which mounts on the bottom side thereof a pair of rearwardly opening, outwardly and rearwardly divergent receiver tubes 33 and 35 constructed for receipt in the open end thereof the forward extremities of respective elongated spring bars 25 and 27.

The box 31 is carried from a rectangular forwardly projecting stem 37 formed with a transversely projecting fastener bore 39. The stem 37 is constructed for telescopical receipt in the rearwardly opening tube 13 to receive therein a fastener pin 41 which projects through bore 39.

The box 31 mounts on the top side thereof a generally U-shaped fifth wheel plate, generally designated 45, which is configured with a pair of rearwardly projecting, laterally spaced apart tines cooperating to form a rearwardly opening, outwardly divergent passage 47. The fingers 44 and 46 are bent to angle downwardly and rearwardly to act as a wedge shaped lead in.

The box 31 mounts an intermediate wall in the horizontal wall 51 which carries thereon a drive pinion 53 which meshes with the gear teeth on a laterally projecting lock bar 55 which is shiftable laterally to project across underneath the passage 47 to thus lock the fifth wheel mechanism in a coupled position. The drive pinion 53 is mounted on a vertical shaft 57 having a forwardly projecting crank 59 connected to the top end thereof to overlie the top wall of such box. The crank 59 carries pivotally at its front end an upwardly projecting handle 61. The crank 59 and handle 61 are configured such that the handle 61 may be grasped to rotate the crank 59 clockwise as viewed in FIG. 1 to thus drive the lock bar 55 to the left as viewed in FIG. 1 to its unlocked position. The crank 59 will be rotated 180° to the rearwardly projecting position shown in FIG. 2 and the handle 61 pivoted downwardly to the downwardly projecting position shown in FIG. 2 and thereby locking the crank 59 against rotation from the lock bar 55 locked position.

Figure 6:
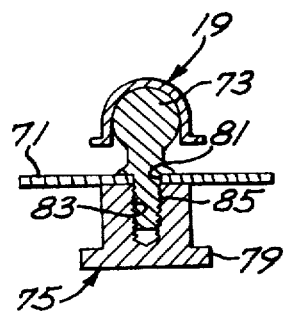
FIG. 6 is a transverse sectional view, taken along the line 6—6 of FIG. 5.

To convert a ball hitch 19 to a fifth wheel hitch, I provide the efficient expediency of an adaptor 17 which includes a circular adaptor plate 71 having mounted on the top side thereof a ball 73 for receipt in such ball hitch. Mounted in axial alignment of the ball 17 below the plate 71 is a conventional king pin, generally designated 75. The king pin 75 is formed with a vertical barrel 77 configured on its bottom end with a retainer flange 79. Referring to FIG. 6, conveniently, the adaptor plate 17 is formed with a through center bore 81 and the barrel 77 formed with an upwardly opening threaded bore 83 for receipt of a downwardly projecting threaded stem 85 formed integral with the ball 73.

Mounted on the opposite frame members of the tongue of the trailer 21 are respective brackets, generally designated 91 and 95 from which one end of respective spring bar chains 97 and 99 are connected. The free ends of the chains 97 and 99 are configured for connection with the rear extremity of the spring bar 25 and 27 in a conventional manner. Weight distribution spring bars of this general type are available under the trademark REESE from Reese, Incorporated, whose address is as follows: Reese, Incorporated, Box 1706, Elkhart, Ind. 46515.

In operation, it will be appreciated that the fifth wheel hitch device 11 may be conveniently mounted to the receiver tube 13 of a conventional frame mounted hitch carried from a recreational vehicle, truck or automobile. Connection may be made by merely inserted the stem 37 in the tube 13 and inserting the fastener pin 41.

Then, to couple with a trailer 21 which might be in the form of a travel trailer, boat trailer or the like, the adaptor plate assembly device 17 may be secured to the ball hitch 19 and the ball hitch 19 closed to secure the king pin 75 in vertical orientation thereunder. When it is desirable to hitch the towing vehicle to such trailer, the driver need merely back the towing vehicle toward such trailer with the fifth wheel plate 45 in general alignment with the king pin 75. It will be appreciated that the tongues of trailers 21 are often supported on height adjustable jacks. Thus, the tongue may be easily adjusted to accommodate the general height of the fifth wheel plate 45. Assuming the fifth wheel plate 45 is in general longitudinal alignment with the king pin 75, it will be appreciated that as the towing vehicle is backed up, the king pin 75 will be received in the open throat of the passage 47 to be guided thereinto as the vehicle is backed slowly into the hitching position. As the path of the backing vehicle reaches the point where the king pin 75 approaches the front extremity of the passage 47, it will engage a conventional trip incorporated in the fifth wheel to automatically shift the lock bar 55 to its locked position. The forward extremities of the spring bars 25 and 27 may then be inserted in the rearwardly opening tubes 33 and 35 and the rear extremities thereof coupled to the respective connecting chains 97 and 99 and such chain cinched in a conventional manner to apply a slight longitudinal compressive force to such spring bars, then lower the tongue jack (not shown).

In this manner, by the triangulation resulting from the front ends of the spring rods 25 and 27 being driven against the front ends of the respective tubes 33 and 35, a portion of the weight of the tongue of the trailer 21 is loaded against such tubes in a horizontal plane below that of the contact point between the king pin 75 and plate 45 thus tending to rotate the device 11 clockwise as viewed from the left side in FIG. 1. This then serves to apply a torque through the hitch tube 13 to the frame of the vehicle for favorable loading to enhance handling characteristics. The tongue jack fully raised and the trailer and towing vehicle is prepared to be underway.

When the destination is reached where it is desirable to park the trailer 21, the trailer may be maneuvered into position, the tongue jack lowered and the spring bars 25 and 27 decoupled at their rearward position and remove for storage. The latch handle 61 may then be raised from the position shown in FIG. 2 to its horizontal or vertical position and the crank 59 rotated clockwise to the position shown in FIG. 1 thus translating the lock bar 55 to the unlocking position to thereby free the king pin 75 so that the towing vehicle may be pulled forwardly from the trailer 21 and will be free and available to serve for transportation without the necessity of towing the trailer along.

Figure 7:
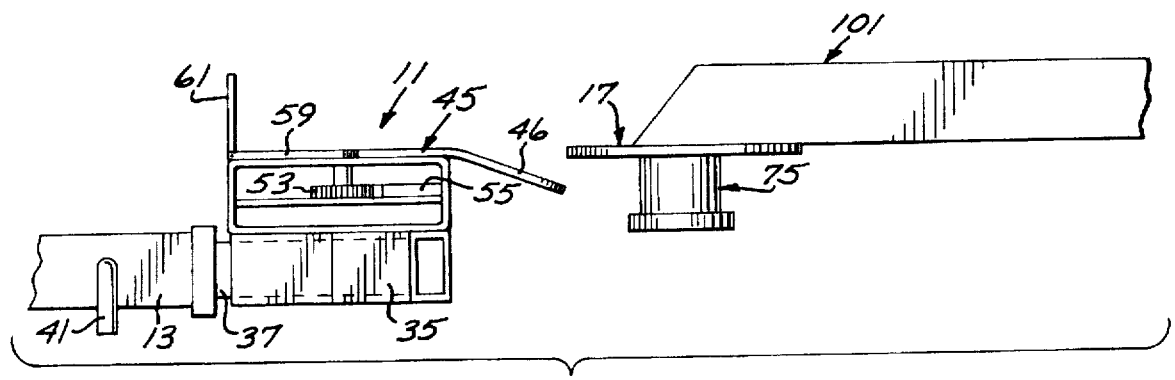
FIG. 7 is a side elevational view of a second embodiment of the fifth wheel trailer hitch apparatus of the present invention.

The fifth wheel hitch apparatus shown in FIG. 7 is similar to the device shown in FIGS. 1–6 except here the king pin adaptor 17 is welded directly to the tongue, generally designated 101, of a trailer for direct coupling to the fifth wheel device 11. Here, the fifth wheel 11 is lined up directly in front of the tongue 101 as shown in FIG. 9 and, as the towing vehicle is backed into position, the king pin barrel 77 is directed directly into the passage 47.

Figure 8:
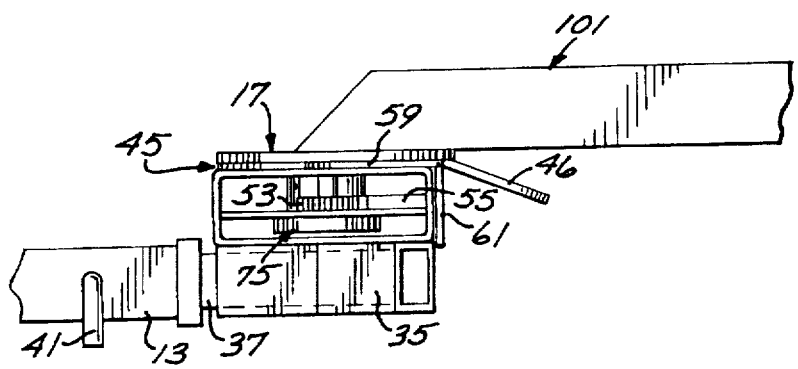
FIG. 8 is a side elevational view similar to FIG. 7 but showing the fifth wheel and king pin coupled together.
Figure 9:
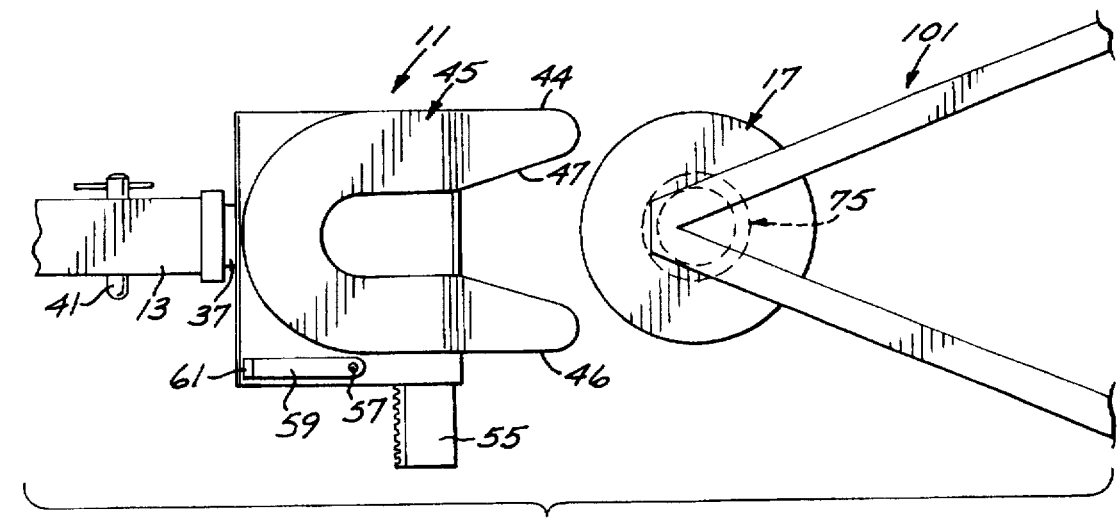
FIG. 9 is a top plan view of the fifth wheel adaptor apparatus shown in FIG. 7.
Figure 10:
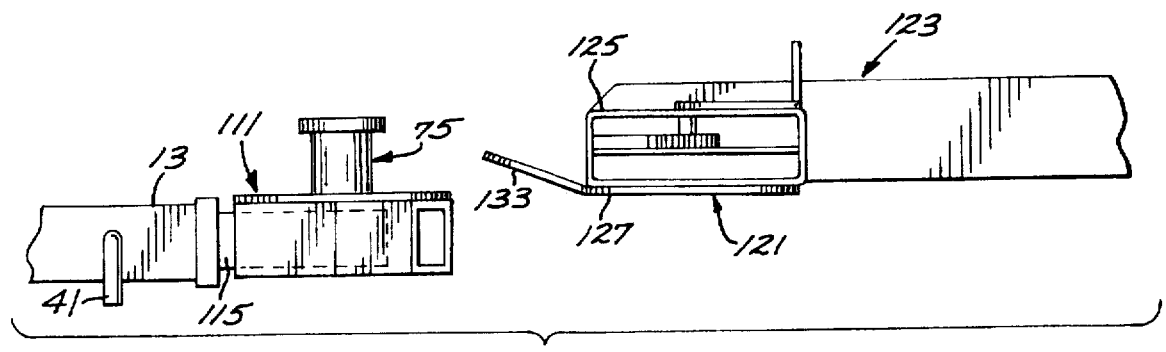
FIG. 10 is a side view of a third embodiment of the fifth wheel adaptor apparatus of the present invention.
Figure 11:
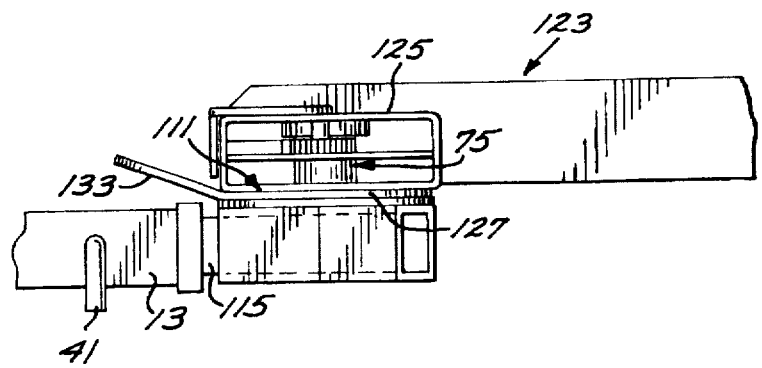
FIG. 11 is a side view, similar to FIG. 10, but showing the king pin and fifth wheel devices coupled together.
Figure 12:
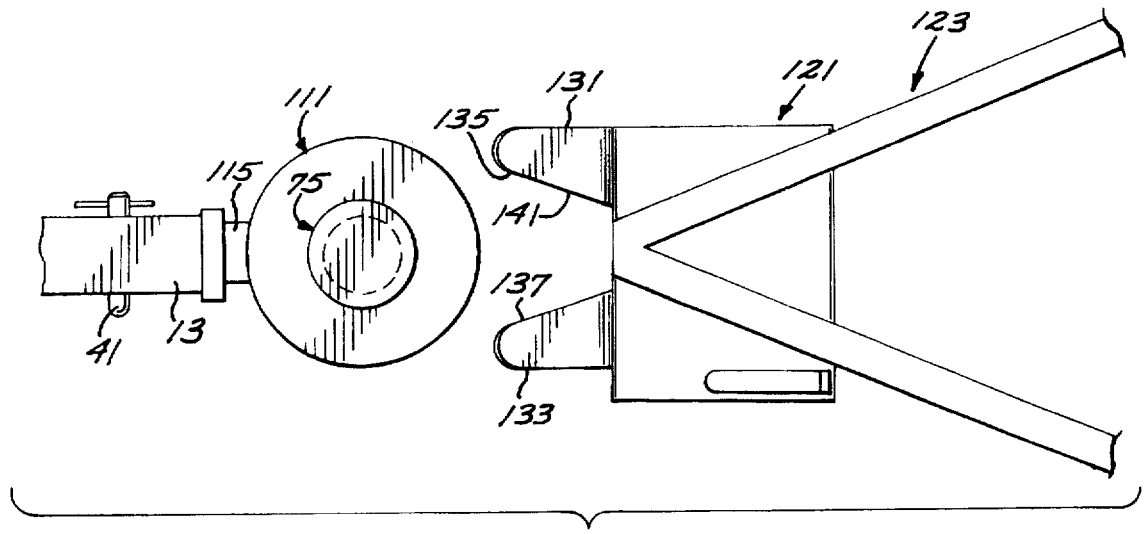
FIG. 12 is a top plan view of the fifth wheel adaptor apparatus shown in FIG. 10.

Referring to FIGS. 10–12, the fifth wheel adaptor apparatus shown therein is essentially a reverse of the apparatus shown in FIGS. 7–9. Here, an adaptor style device, generally designated 111, is configured with a box shaped housing 113 having a forwardly projecting rectangular cross section stem 115 received in a rearwardly opening receiver tube 13 to be held in place by means of a fastener pin 41. An upstanding king pin 75 is then mounted from the top surface of the box housing 113. A fifth wheel device, generally designated 121, is mounted from the trailer tongue, generally designated 123. The fifth wheel device 121 includes a box housing 125 which mounts a fifth wheel plate 127 configured with laterally disposed fingers 131 and 133 (FIG. 12) which are formed on their proximal sides with outwardly diverging ledge surfaces 135 and 137, respectively, to form a forwardly opening passage 141. Consequently, the king pin device 111 may be mounted from the receiver tube 13, as shown in FIG. 10, and as the towing vehicle is backed into position adjacent the trailer, the king pin 75 will be received in the passage 141 as shown in FIG. 12 to be urged into locking position as shown in FIG. 11.

From the foregoing, it will be apparent that the hitch mounted fifth hitch apparatus of the present invention provides an economical and convenient means for towing a travel trailer, boat trailer or the like from the frame of a towing vehicle. The apparatus provides a convenient means for coupling the towing vehicle to the travel trailer tongue and allows for ready disengagement of the towing vehicle for use separate from the trailer. The device employs a convenient and reliable ball and king pin adaptor which allows for adapting a conventional ball hitch trailer to a king pin construction.

Various modifications and changes may be made with regard to the foregoing detailed description without departing from the spirit of the invention.

What is claimed:

1. Fifth wheel trailer hitch adaptor apparatus for hitching a trailer tongue to a towing vehicle trailer hitch disposed beneath the rear bumper of the type having a rearwardly opening rectangular hitch tube and comprising:

a fifth wheel device including a yoke plate formed by a pair of laterally spaced apart fingers cooperating to form a longitudinal, open ended king pin passage;

a king pin device including a vertical king pin adapted to be received longitudinally in said king pin passage;

a ball hitch having a downwardly opening ball socket and that includes:

an adaptor configured with a horizontal adaptor plate and including on the top side of said plate an upstanding ball for receipt in said socket and on the bottom side a downwardly projecting pin defining said king pin;

said other of said devices includes a locking device shiftable into a locking position in the path of said king pin as it moves in said passage to lock said king pin in said passages and a latch coupled with said locking device and including a handle shiftable to a latching position to positively latch said locking device in said locking position;

one of said devices being mounted on said trailer;

the other of said devices including a rectangular coupling stem to be removably received in said tube; and a releasable fastener for removably fastening said stem in said tube whereby said other of said devices may be removably mounted to said hitch tube for, upon backing of said towing vehicle toward said trailer tongue with said passage and pin in longitudinal alignment, said pin will be received in said passage.

2. Fifth wheel trailer hitch adaptor apparatus as set forth in claim 1 wherein:

said other of said devices mounts said fifth wheel and said yoke plate is configured with said fingers, when said stem is in said tube, angled rearwardly and downwardly.

3. Fifth wheel trailer hitch adaptor apparatus as set forth in claim 2 wherein:

said other of said devices includes a pair of rearwardly opening spring bar receivers spaced below the level of said yoke plate for receiving the forward extremities of spring bars coupled on their respective rear extremities to the opposite sides of said tongue.

4. Fifth wheel trailer hitch adaptor apparatus as set forth in claim 2 wherein:

said other of said devices includes a pair of rearwardly facing spring bar receivers and said apparatus further includes:

a pair of elongated spring bars configured on their respective one extremities for connection to the respective opposite sides of said tongue and including on their respective opposite extremities with connectors for connection to the respective said receivers.

5. Fifth wheel trailer hitch adaptor apparatus as set forth in claim 1 wherein:

said other of said devices includes said fifth wheel; and said one of said devices is mounted on said trailer tongue.

* * * * *